Figure 1:
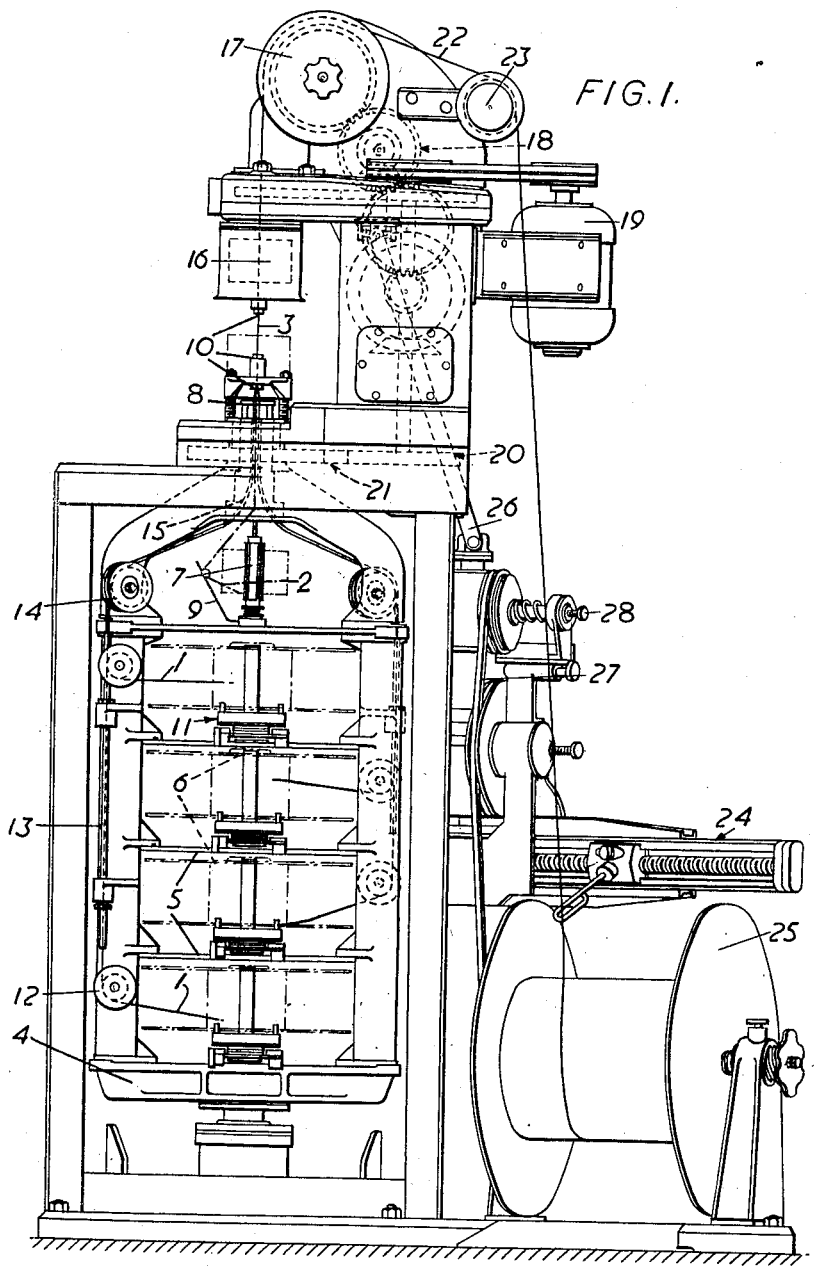

Jan. 12, 1960 W. H. C. STARK 2,920,437
MACHINES FOR TWISTING TOGETHER ELECTRIC CONDUCTORS
Filed Nov. 4, 1957 3 Sheets-Sheet 1

Inventor
William Harry Charles Stark,
By
Hooper, Leonard & Buell,
Attorneys

Jan. 12, 1960 W. H. C. STARK 2,920,437
MACHINES FOR TWISTING TOGETHER ELECTRIC CONDUCTORS
Filed Nov. 4, 1957 3 Sheets-Sheet 2
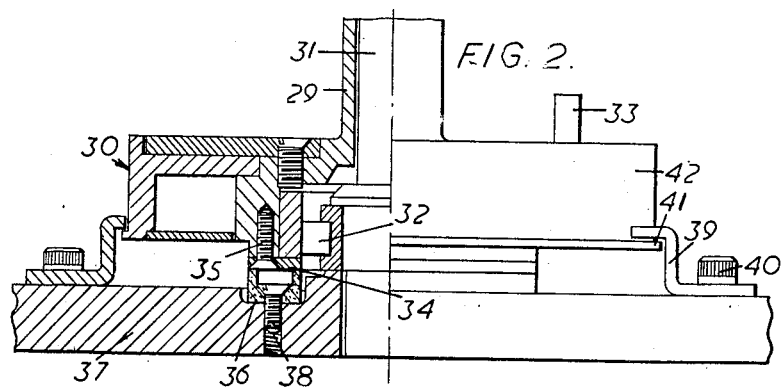
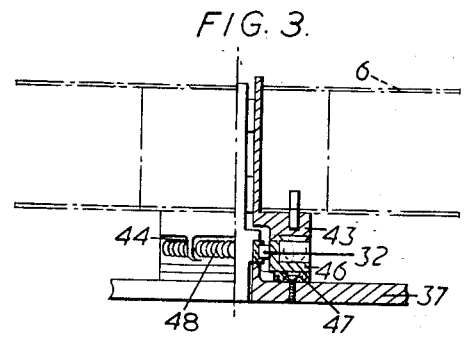
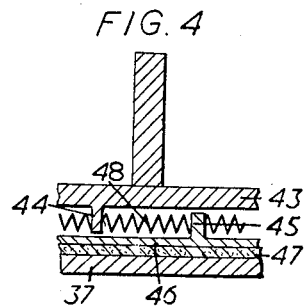

Jan. 12, 1960 W. H. C. STARK 2,920,437
MACHINES FOR TWISTING TOGETHER ELECTRIC CONDUCTORS
Filed Nov. 4, 1957 3 Sheets-Sheet 3

Inventor
William Harry Charles Stark,
By
Hooper, Leonard & Buell,
Attorneys

United States Patent Office 2,920,437
Patented Jan. 12, 1960

2,920,437

MACHINES FOR TWISTING TOGETHER ELECTRIC CONDUCTORS

William Harry Charles Stark, Shenfield, England, assignor to Southern United Telephone Cables Limited, Dagenham Dock, England, a British company Application November 4, 1957, Serial No. 694,183

Claims priority, application Great Britain November 8, 1956

14 Claims. (Cl. 57—17)

This invention relates to machines for twisting together electric conductors, either insulated or bare, to form a strand or bunch. The invention is more particularly, but not exclusively, concerned with machines for twisting together insulated conductors, such as the cores of telephone cables, e.g. to form quads.

Machines of this type comprise essentially a rotating frame, which either carries a number of reels of the conductor or rotates about a number of such reels, a take-up device for the strand or bunch to be formed and a shaping device which is located in the path of the conductors between the reels and the take-up device and which brings the various conductors together to form a bunch or a strand as they pass from the reels through guides on the frame to the take-up device. This shaping device may be stationary or may rotate with the frame. Alternatively where it comprises two or more parts, one or more may rotate with the frame and one or more may be stationary. It may comprise a die or dies with or without a lay plate. When a lay plate is used it will be mounted on the frame to rotate therewith.

In the machine in accordance with this invention, the frame rotates about a vertical axis and all of the reels carrying the conductors are mounted coaxially within the frame and are carried by the frame. Each reel is mounted on the frame in such a way that the only rotation of the reel which takes place with respect to the frame is that brought about by the tension in the conductor as it is drawn off the reel in its passage from the reel through the shaping device to the take-up device, this rotation being resisted by a frictional force which is dependent on the weight of the reel and its contents. Preferably the conductor is taken from the reel in such a way that the relative rotation between the reel and the frame is opposite in direction to the direction of rotation of the frame, that is to say, the reel rotates in space at a speed less than the speed of rotation of the frame. In accordance with normal practice, the frame carries guides which lead the conductors from the reels to the shaping device in directions such that in the die the conductors are appropriately disposed to form a bunch or strand of the required shape.

Preferably the reel is mounted on and coupled to a carrier comprising a tube which fits over and is free to rotate about a spindle mounted on the frame. The carrier is formed at its lower end with a smooth annular metal surface which rests on a corresponding annular friction surface attached to the reel support. The annular surface of the reel carrier is preferably of polished steel and the friction surface of a material having a suitable friction coefficient.

To compensate for the fact that the frictional force between the reel carrier and the frame diminishes as the weight of the reel diminishes and the moment of the tension of the conductor about the axis of the reel diminishes as the quantity of conductor remaining on the reel diminishes, part only of the weight of the reel may be supported by the frictional device and the remainder of the weight taken by a spring loaded auxiliary support arranged between the reel and the frame. In this case one element of the frictional coupling may itself be spring loaded, e.g. by interposing a compression spring or springs between the support and a friction ring on which the reel carrier rests or between an annular metal ring and the reel carrier, the ring itself resting on the friction surface.

The spring or springs are so mounted that vertical movement can take place between the support and the friction ring or between the annular metal ring and the reel carrier as the case may be; the arrangement is such that no relative rotation, or only a limited extent of relative rotation, can take place between these parts. The auxiliary support for the reel is designed in such a way that it offers a minimum resistance to the rotation of the reel relative to the support. The spring or springs of the auxiliary support may, for example, extend between the reel carrier and one element of a thrust ball race, the other element of which is mounted on the machine frame. The springs are mounted in such a way that relative rotation between the reel carrier and the element of the ball race on which the springs act cannot take place. The springs on the friction device and the springs on the auxiliary support for the reel are so chosen as to have a "differential effect" so that the friction device takes up a varying proportion of the weight of the reel as its weight diminishes. By correct choice of springs and adjustment of the initial setting of the springs, the tension in the conductor can be made to remain substantially constant.

To avoid snatching in the take-up of the conductor I may provide a resilient coupling which allows a limited extent of relative rotation between the reel and the friction device. This coupling is conveniently incoporated in the reel carrier. It may be of the kind in which a number of springs are arranged approximately circumferentially between spiders forming part of the members between which resilience is required. One spider may be formed by a number of radial lugs projecting downwards from the lower surface of the reel carrier and the other spider will then be formed by an equal number of radial lugs projecting vertically from the upper side of the polished steel ring which rests on the annular friction surface carried by the support. Compression springs are arranged between alternate lugs on the carrier and on the steel ring.

To facilitate reel changing, the whole of the supporting arrangement for each reel, including the friction device, may be carried on a member which can readily be withdrawn from the frame. Preferably this member is attached to the frame in such a way that, after the reel assembly has been withdrawn clear of the frame, the member, although remaining attached to the frame, can be hinged in such a way that it rotates from the horizontal position to an inclined or a substantially vertical position, thus enabling the reel to be readily withdrawn. The member may, for example, consist of a flat plate provided at one end on each side with a projecting lug which runs in a horizontal groove in a fixed part of the frame. As the plate is at first withdrawn horizontally, the lugs slide in the grooves until the reel is clear of the frame and the lugs bear against the ends of the grooves. The plate is then lowered into the position for removing the reel by allowing it to pivot about the lugs.

The drive for the take-up device for the strand or bunch is preferably mechanically coupled to the drive for the frame. I prefer to use a constant take-up speed for the bunch or strand and to provide a variable gear arrangement in the drive for the frame, to enable the lay of the bunch or strand to be varied as required.

Figure 5:
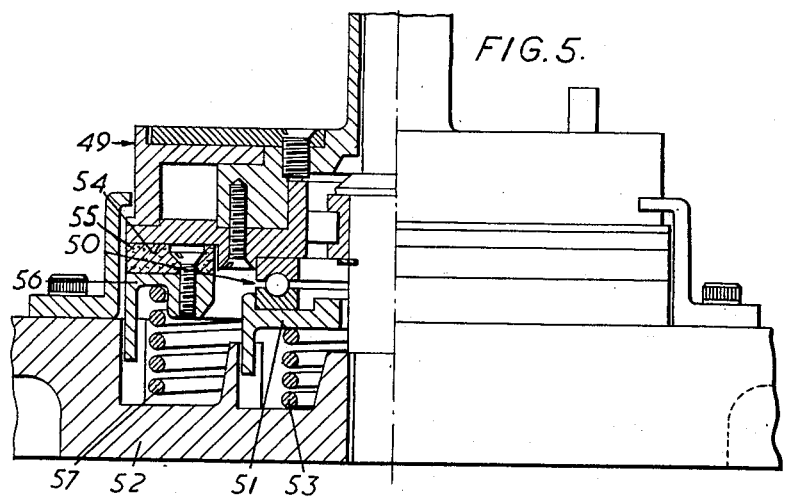
Figure 6:
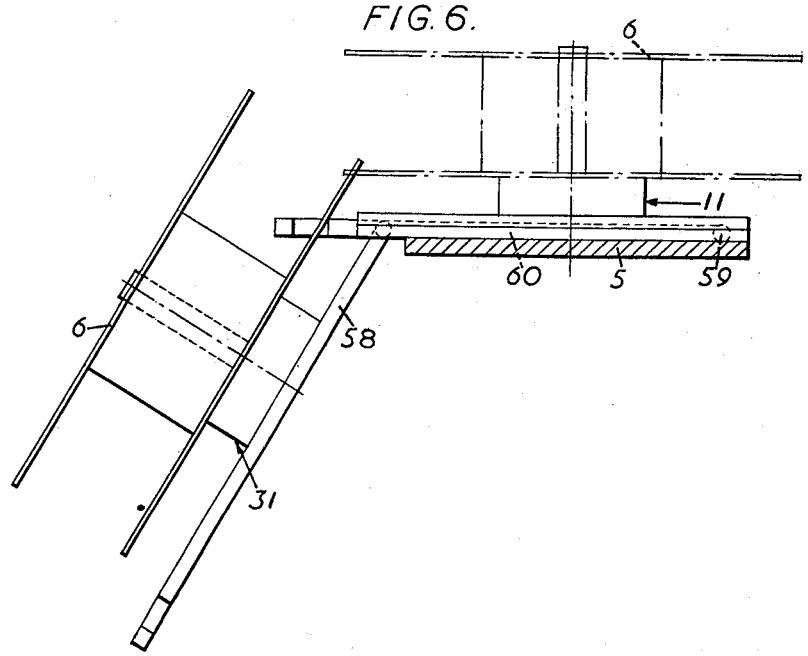

An example of a machine in accordance with the invention and a number of modified forms of reel carrier will now be described with reference to the accompanying drawings in which:

Figure 1 is a front elevation of the machine,

Figure 2 is a view, partly in section and partly in elevation, of one form of the combined reel carrier and friction device, Figure 3 is a simplified view, partly in section and partly in elevation, showing another form of the reel supporting assembly, Figure 4 is a diagrammatic view of part of the assembly shown in Figure 3, Figure 5 is a view, partly in section and partly in elevation, of a third form of the reel-supporting assembly, and Figure 6 is a simplified view showing the way in which the reel and its supporting assembly can be withdrawn and pivoted to facilitate removal and replacement of the reel.

Referring to Figure 1, the machine is designed for bunching four conductors 1 about a central string 2 to form a quad 3. A rotating frame 4 is provided with five horizontal platforms 5, the lower four platforms each carrying one of the conductor reels 6 and the top platform having mounted on it a rotatable support 7 for the string cop which supplies the centre string 2. Mounted below the support 7 is a guide 9 for leading the string 2 off the rotating cop and feeding it to the stationary forming dies 10 through the lay plate 8 which rotates with the frame and positions the conductors 1 and centre string 2 so that they enter the forming dies correctly. The support 7 is hinged and can be pulled down, by releasing a spring-loaded pawl (not shown), into an inclined position to facilitate loading the string cop.

The reels 6 are mounted on carriers denoted generally by 11 which are free to rotate on vertical spindles and which are coupled to the platforms 5 by the frictional devices mentioned above and to be more fully described in connection with Figures 2, 3, 4 and 5.

From each reel 6 the conductor 1 passes to its associated pulley 12 carried by the frame 4, under this pulley, vertically upwards through a guide tube 13 mounted on the frame, over a second pulley 14 mounted on the upper part of the frame and inwards to a bell-mouth 15 through which it passes before entering first the lay plate 8 mounted on the axis of the frame and then the forming dies 10.

The quad 3 leaving the dies 10 passes vertically upwards through a whipping head 16 on to a take-up capstan 17. The whipping head applies a cotton to the quad in the normal way. The take-up capstan 17 is driven through a gear train, denoted generally by 18, by an electric motor 19 which also drives the frame by a second gear train 20, incorporating change gears 21. Thus the lay of the quad 3 can be varied by means of the change gears 21 while the take-up speed remains constant.

The conductors 1 are taken from the supply reels 6 in such a direction that these reels are rotated relatively to the frame 4, against the force exerted by the friction device 11, in the opposite direction to the direction of rotation of the frame.

After leaving the take-up capstan 17 the completed quad 22 passes over a pulley 23 and down to the cable reel traversing mechanism, denoted generally by 24, which flakes the quad on the take-up reel 25.

The traversing mechanism 24 is driven by conventional gearing (not shown) from the Hardy-Spicer shaft 26 which is driven in turn from the first gear train 18. Provision is also made in the drive from the Hardy-Spicer shaft 26 to the traversing mechanism for a drive to the take-up reel through a belt 27. Control of the main take-up tension is by means of a knob 28. Adjustments of the speed of traverse and of the traverse tension are provided for, the adjustment means being of conventional design.

Figure 2 shows one form of combined conductor reel support and friction device. The reel (not shown) is placed on its side over a tubular extension 29 of a reel carrier 30. The flange of the reel rests on the reel carrier 30, which is free to rotate about a spindle 31 on a roller bearing 32. A stud 33 engages in a hole in the reel flange to prevent relative movement between the reel and the carrier 30.

The friction device comprises a smooth-surfaced ring 34, e.g. of polished steel, secured to the reel carrier 30 by countersunk screws 35. This ring 34 may be integral with the outer race of the roller bearing 32, as shown with reference to member 46 of Figure 3. The lower surface of the ring 34 bears on a friction ring 36 of suitable material secured to the supporting member 37 by countersunk screws 38. The member 37 is secured to one of the platforms 5 (Figure 1).

The frictional resistance between the members 34 and 36 is dependent on the combined weight of reel and contents. Retainers 39, secured to the member 37 by setscrews 40, co-operate with a flange 41 on the side-wall 42 of the reel carrier 30 to allow only limited axial movement of the carrier 30 relative to the spindle 31 which is rigidly secured to the supporting member 37.

Figures 3 and 4 show a preferred method of providing a resilient coupling between the reel and the friction device to avoid snatching in the take-up of the conductor. The upper part 43 of the reel carrier carrying a reel 6 has depending from it a number of radial lugs 44 which form a spider. Another spider is formed by an equal number of lugs 45 (Figure 4) projecting vertically upwards from a polished steel member 46 which rests on the surface of an annular friction ring 47 secured to the supporting member 37, and which also acts as the outer cage of the roller bearing 32. Compression springs 48 are arranged between alternate lugs on the upper part 43 of the reel carrier and on the steel ring 46. As the conductor is drawn off the reel 6, the reel and the upper part 43 of the reel carrier rotate together, putting successive springs 48, alternately, in compression and tension, or, in the case when all springs are initially in compression, alternately in increased compression and reduced compression. This increase of compression of alternate springs continues until the polished steel member 46 is forced to move over the annular friction ring 47. Thus, the resistance to rotation of the reel 6 is gradually increased from a zero value to its operating value at which the reel carrier as a whole slides over the friction surface of the ring 47.

Figure 5 shows our preferred form of the combined reel carrier and friction device. The reel (not shown) is mounted on a reel carrier 49 in the manner described with reference to Figure 2. A proportion of the weight of the reel is taken by a ball thrust bearing 50 which has its upper cage secured to the reel carrier 49 and its lower cage secured to a splined fitting 51 which is free to move vertically (but not to rotate) with respect to a support member 52 and which is supported by a spring 53 concentric with the reel carrier.

The frictional retarding force for the reel carrier 49 results from the reaction between a polished steel surface 54 on the under surface of the reel carrier 49 and a friction ring 55 mounted on a splined fitting 56, similar to the fitting 51, which is free to move vertically only with respect to the support member 52 under the action of a second spring 57, also concentric with the reel carrier.

Retainers for the reel carrier, similar in action to the retainers 39 (Figure 2) are provided.

The springs 53 and 57 are chosen to have a "differential effect" so that the friction device takes up a varying proportion of the weight of the reel as its weight diminishes.

The following table shows by way of example how the "differential effect" can be used to obtain a substanially constant tension in the conductors. In this example the spring 53 is rated at 80 lbs. per inch and initially is not compressed; the spring 57 is rated at 40 lbs. per inch and has ¼″ of initial compression. The empty reel weighs 10 lbs. The coefficient of friction between the polished steel annulus and the friction ring is 0.25.

| Weight of reel and conductor (in lbs.) | Radius of pull [1] (in inches) | Calculated conductor tension (lbs.) |
|---|---|---|
| 13 | 3⅝ | 0.90 |
| 14⅝ | 3⅞ | 0.88 |
| 19¼ | 4½ | 0.86 |
| 22½ | 4³¹⁄₃₂ | 0.85 |
| 26¾ | 5⁷⁄₁₆ | 0.85 |

[1] I.e. half the outside diameter of the coil of conductor on the reel.

My preferred arrangement for facilitating reel changing is shown in Figure 6 in which a reel 6 is supported by a reel carrier 11 (see also Figure 1) which is secured to a supporting member 58 which is equivalent to the members 37 and 52 described with reference to Figures 2 and 5. The member 58 is provided at one end on each side with a projecting lug 59 which runs in a horizontal groove 60 in a fixed part of the supporting platform 5 (see also Figure 1). As the member 58 is at first withdrawn horizontally the lugs 59 slide in the grooves 60 until the reel 6 is clear of the frame 4 (Figure 1) and the lugs bear against the ends of the grooves. The member 58 is then allowed to adopt an inclined or a substantially vertical position in which the reel 6 may be readily withdrawn, retainers such as 39 (Figure 2) acting to keep the combined reel carrier and friction device 11 in position on the support member 58.

The machine has the following advantages. It can be driven at high speed since the supply reels are coaxial with the frame. The friction arrangements coupling the reels to the frame can be so designed that the tension of the conductors is maintained substantially constant. Changes of lay are readily obtained by altering the speed of rotation of the frame without affecting the speed of manufacture of the quad. The machine is simple to load and loading can be made even simpler by the use of sliding and pivoting members as described above. A uniform disposition of the cores in the quad is readily obtained and this with the controlled tension in the conductors enables a quad with good electrical characteristics to be manufactured.

In the following claims the word "strand" includes regular strands in which the conductors are arranged in concentric layers, irregular strands usually known in the industry as "bunches" and the "twins" and "quads" used in telephone cables.

What I claim as my invention is:

1. A machine for twisting together electric conductors to form a strand, comprising a frame, means for rotating said frame about a vertical axis, means for supporting each of a plurality of reels for said conductors coaxially within said frame and coaxially with each other, a plurality of frictional couplings, one between each reel and the frame, each applying substantially the sole braking force retarding the rotation of the reel with which it is associated with respect to said frame, the magnitude of which braking force is dependent on the weight of the contents of the reel, a shaping device for bringing said conductors together to form a strand, a take-up device for the strand, and guide means on said frame for leading each of said conductors from its reel through said shaping device, whereby each reel is rotated with respect to said frame against said braking force, under the tension in its conductor, as said strand is formed.

2. A machine for twisting together electric conductors to form a strand comprising a frame, means for rotating said frame about a vertical axis, reel carrier for supporting each of a plurality of reels for said conductors coaxially within said frame and coaxially with each other, a plurality of frictional couplings, one between each reel carried and the frame, each applying substantially the sole braking force retarding the rotation of the reel and its carrier with which each frictional coupling is associated with respect to said frame, the magnitude of which braking force is dependent on the weight of the contents of the reel, each of said frictional couplings comprising an annular surface on the lower part of said carrier and a corresponding annular surface on said frame, said surfaces being maintained in contact by the combined weight of said carrier, reel and conductor, a shaping device for bringing said conductors together to form a strand, a take-up device for the strand, and guide means on said frame for leading each of said conductors from its reel through said shaping whereby each reel is rotated with respect to said frame against said braking force, under the tension in its conductor, as said strand is formed.

3. A machine for twisting together electric conductors to form a strand as claimed in claim 2, wherein said annular surface on said reel carrier is of polished metal and said annular surface associated with said frame is of a material having a suitable coefficient of friction.

4. A machine for twisting together electric conductors to form a strand, as claimed in claim 2, wherein a resilient coupling is inserted between each of said reel carriers and said frame to prevent snatching when taking-up the conductors.

5. A machine for twisting together electric conductors to form a strand comprising a frame, means for rotating said frame about a vertical axis, reel carriers for supporting each of a plurality of reels for said conductors coaxially within said frame and coaxially with each other, a plurality of frictional couplings, one between each reel carrier and the frame, each applying substantially the sole braking force retarding the rotation of the reel and its carrier with which each frictional coupling is associated, with respect to said frame, the magnitude of which braking force is dependent on the weight of the contents of the reel, each of said frictional couplings comprising an annular surface on the lower part of said carrier and a corresponding annular surface associated with said frame, said surfaces being maintained in contact by part of the combined weight of said carrier, reel and conductor, a spring-loaded auxiliary support arranged between said carrier and said frame, the remainder of the combined weight of said carrier, reel and contents being taken by said spring-loaded support, a shaping device for bringing said conductors together to form a strand, a take-up device for the strand, and guide means on said frame for leading each of said conductors from its reel through said shaping device whereby each reel is rotated with respect to said frame against said braking force, under the tension in its conductor, as said strand is formed.

6. A machine for twisting together electric conductors to form a strand, as claimed in claim 5, wherein said spring-loaded auxiliary support comprises at least one spring and a thrust bearing, said spring extending between said frame and one element of said thrust bearing, the other element of said bearing being secured to said carrier.

7. A machine for twisting together electric conductors to form a strand, as claimed in claim 5, wherein said annular surface on said reel carrier is of polished metal and the annular surface associated with said frame is of a material having a suitable coefficient of friction.

8. A machine for twisting together electric conductors to form a strand comprising a frame, means for rotating said frame about a vertical axis, reel carriers for supporting each of a plurality of reels for said conductors coaxially within said frame and coaxially with each other, a plurality of frictional couplings, one between each reel carrier and the frame, each applying substantially the sole braking force retarding the rotation of the reel and its carrier with which each frictional coupling is associated, with respect to said frame, the magnitude of which braking force is dependent on the weight of the contents of the reels, each of said frictional couplings comprising an annular surface on the lower part of said carrier, a ring supported by at least one spring on the frame in such a way as to prevent relative rotation between the ring and the frame, the top surface of said ring being held in contact with said annular surface on said carrier by said spring, a part of the combined weight of said carrier, reel and conductor being taken by said contacting annular surfaces, a spring-loaded auxiliary support arranged between said carrier and said frame, the remainder of the combined weight of said carrier, reel and contents being taken by said spring-loaded support, a shaping device for bringing said conductors together to form a strand, a take-up device for the strand, and guide means on said frame for leading each of said conductors from its reel through said shaping device whereby each reel is rotated with respect to said frame against said braking force, under the tension in its conductor, as said strand is formed.

9. A machine for twisting together electric conductors to form a strand comprising a frame, means for rotating said frame about a vertical axis, reel carriers for supporting each of a plurality of reels for said conductors coaxially within said frame and coaxially with each other, a plurality of frictional couplings, one between each reel carrier and the frame, each applying substantially the sole braking force retarding the rotation of the reel and its carrier with which each frictional coupling is associated, with respect to said frame, the magnitude of which braking force is dependent on the weight of the contents of the reel, each of said frictional couplings comprising an annular surface on the lower part of said carrier, a ring supported by at least one spring on the frame in such a way as to prevent relative rotation between the ring and the frame, the top surface of said ring being held in contact with said annular surface on said carrier by said spring, a part of the combined weight of said carrier reel and conductor being taken by said contacting annular surfaces, a spring-loaded auxiliary support arranged between said carrier and said frame, the remainder of the combined weight of said carrier, reel and contents being taken by said spring-loaded support, a shaping device for bringing said conductors together to form a strand, a take-up device for the strand, and guide means on said frame for leading each of said conductors from its reel through said shaping device whereby each reel is rotated with respect to said frame against said braking force under the tension in its conductor, as said strand is formed and wherein the relative forces exerted by said spring of said spring-loaded auxiliary support and said spring supporting said ring are such that said contacting annular surfaces take up a varying proportion of the weight of said carrier, reel and conductor as the amount of said conductor decreases, whereby the tension in said conductor drawn off said reel remains substantially constant.

10. A machine for twisting together electric conductors to form a strand comprising a frame, means for rotating said frame about a vertical axis, reel carriers for supporting each of a plurality of reels for said conductors coaxially within said frame and coaxially with each other, a support member for each reel carrier mounted on said frame in such a way as to be readily withdrawable from said frame, a plurality of frictional couplings, one between each reel carrier and the frame, each applying substantially the sole braking force retarding the rotation of the reel and its carrier with which each frictional coupling is associated, with respect to said frame, the magnitude of which braking force is dependent on the weight of the contents of the reel, each of said frictional couplings comprising an annular surface on the lower part of said carrier and a corresponding annular surface on said support member, said surfaces being maintained in contact by the combined weight of said carrier, reel and conductor, a shaping device for bringing said conductors together to form a strand, a take-up device for the strand, and guide means on said frame for leading each of said conductors from its reel through said shaping device whereby each reel is rotated with respect to said frame against said braking force under the tension in its conductor, as said strand is formed.

11. A machine for twisting together electric conductors to form a strand as claimed in Claim 10, wherein said support member is attached to said frame in such a way that after said support member has been withdrawn from said frame, with said reel clear of said frame, said support member remains pivotally attached to said frame.

12. A machine for twisting together electric conductors to form a strand, as claimed in Claim 10, wherein said support member consists of a plate provided at one end on each side with a lug, horizontal grooves in a fixed part of said frame, said lugs running in said grooves so that as said plate and said reel carrier and reel mounted thereon are withdrawn horizontally, said lugs run in said grooves until said reel is clear of said frame, and said lugs bear against the ends of said grooves and act as pivots for said plate.

13. A machine for twisting together electric conductors to form a strand comprising a frame, reel carriers for supporting each of a plurality of reels for said conductors coaxially within said frame and coaxially with each other, a plurality of frictional couplings, one between each reel carrier and the frame, each applying substantially the sole braking force retarding the rotation of the reel and its carrier with which each frictional coupling is associated, with respect to said frame, the magnitude of which braking force is dependent on the weight of the contents of the reel, each of said frictional couplings comprising an annular surface on the lower part of said carrier and a corresponding annular surface on said frame, said surfaces being maintained in contact by the combined weight of said carrier, reel and conductor, a shaping device for bringing said conductors together to form a strand, a take-up device for the strand, means for rotating said frame about a vertical axis mechanically coupled with said take-up device, and guide means on said frame for leading each of said conductors from its reel through said shaping device whereby each reel is rotated with respect to said frame against said braking force, under the tension in its conductor, as said strand is formed.

14. A machine for twisting together electric conductors to form a strand comprising a frame, reel carriers for supporting each of a plurality of reels for said conductors coaxially within said frame and coaxially with each other, a plurality of frictional couplings, one between each reel carrier and the frame, each applying substantially the sole braking force retarding the rotation of the reel and its carrier with which each frictional coupling is associated, with respect to said frame, the magnitude of which braking force is dependent on the weight of the contents of the reel, each of said frictional couplings comprising an annular surface on the lower part of said carrier and a corresponding annular surface on said frame, said surfaces being maintained in contact by the combined weight of said carrier, reel and conductor, a shaping device for bringing said conductors together to form a strand, a take-up device for the strand, means for rotating said frame about a vertical axis, a variable gear assembly mechanically coupling said take-up device and said means for rotating said frame and guide means on said frame for leading each of said conductors from its reel through said shaping device whereby said reel is rotated with respect to said frame against said braking force, under the tension in its conductor, as said strand is formed.

References Cited in the file of this patent

UNITED STATES PATENTS

| | | |
|---|---|---|
| 1,193,321 | Walls | Aug. 1, 1916 |
| 1,730,431 | Keefer | Oct. 8, 1929 |
| 2,353,432 | Arrington | July 11, 1944 |